United States Patent [19]

Bellemare et al.

[11] Patent Number: 5,701,183
[45] Date of Patent: Dec. 23, 1997

[54] APPARATUS AND METHOD FOR SELECTIVE ARCHIVING OF FACSIMILE MESSAGES

[75] Inventors: Richard A. Bellemare, Oakville; Edward G. Keplinger, Woodbury, both of Conn.

[73] Assignee: Pitney Bowes Inc., Stamford, Conn.

[21] Appl. No.: 576,665

[22] Filed: Dec. 21, 1995

[51] Int. Cl.⁶ ..................................... H04N 1/00
[52] U.S. Cl. ................ 358/404; 358/403; 358/435; 358/440
[58] Field of Search ................. 358/403, 404, 358/405, 431, 435, 438, 439, 440; 379/93, 95

[56] References Cited

U.S. PATENT DOCUMENTS

| | | | |
|---|---|---|---|
| 5,283,665 | 2/1994 | Ogata | 358/434 |
| 5,291,302 | 3/1994 | Gordon et al. | 358/404 |
| 5,291,304 | 3/1994 | Horii | 358/440 |
| 5,291,305 | 3/1994 | Sakashita et al. | 358/403 |
| 5,293,253 | 3/1994 | Kida | 358/404 |
| 5,293,256 | 3/1994 | Fukushima et al. | 358/468 |
| 5,301,035 | 4/1994 | Hayafune | 358/440 |
| 5,307,178 | 4/1994 | Yoneda | 358/440 |
| 5,321,741 | 6/1994 | Kaneko et al. | 358/436 |
| 5,361,138 | 11/1994 | Motegi | 358/404 |

*Primary Examiner*—Thomas D. Lee
*Assistant Examiner*—Jerome Grant, II
*Attorney, Agent, or Firm*—Robert H. Whisker; Melvin J. Scolnick

[57] ABSTRACT

A facsimile system having a capability to selectively retransmit transmitted and received facsimile signals to an archive station. A facsimile system including a scanner, printer, modem and memory for storing a speed dial directory, documents storage, and system parameters is controlled to transmit and receive facsimile signals and to selectively retransmit such signals to an archive station. As remote stations identified in the speed dial directory are those stations for which it is likely communications need not be archived, entries in the speed dial directory include a field for an exception tag. Prior to retransmission to the archive station the phone number of the remote station is tested against the phone numbers in the speed dial directory and if that number is found in the directory, and is tagged, the facsimile signal transmitted to, or received from, that remote station is not archived.

9 Claims, 4 Drawing Sheets

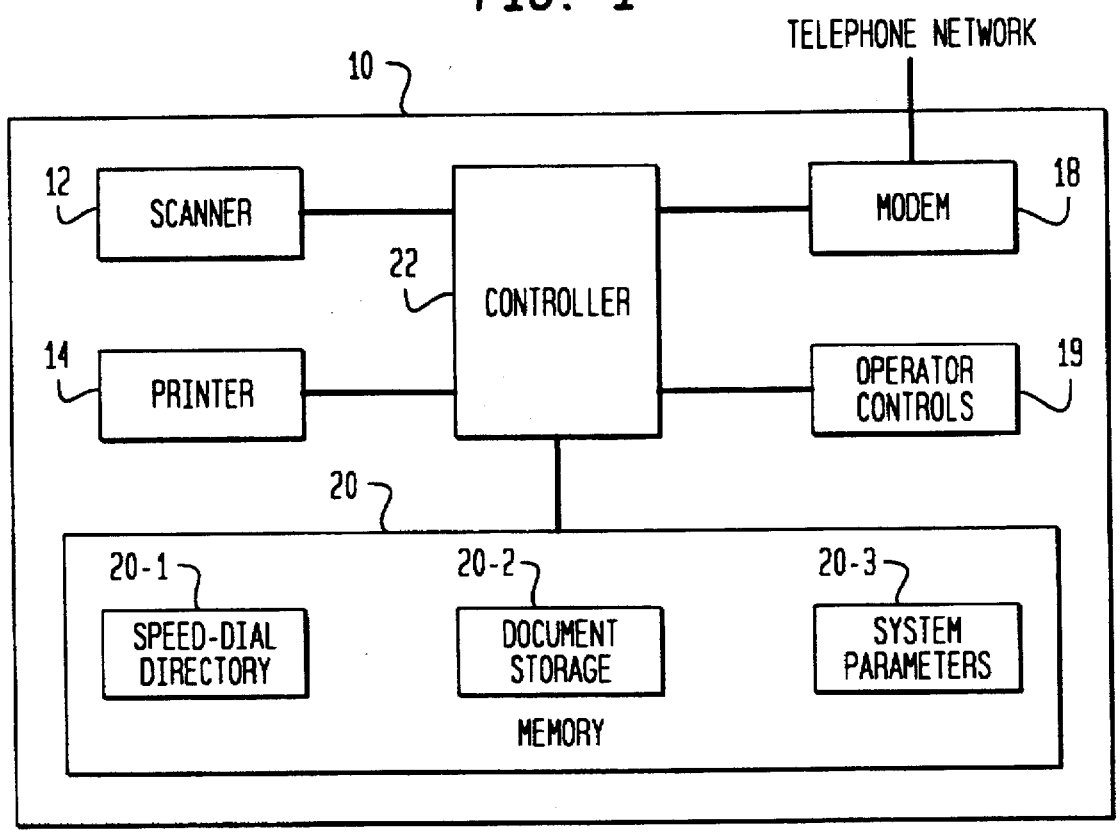

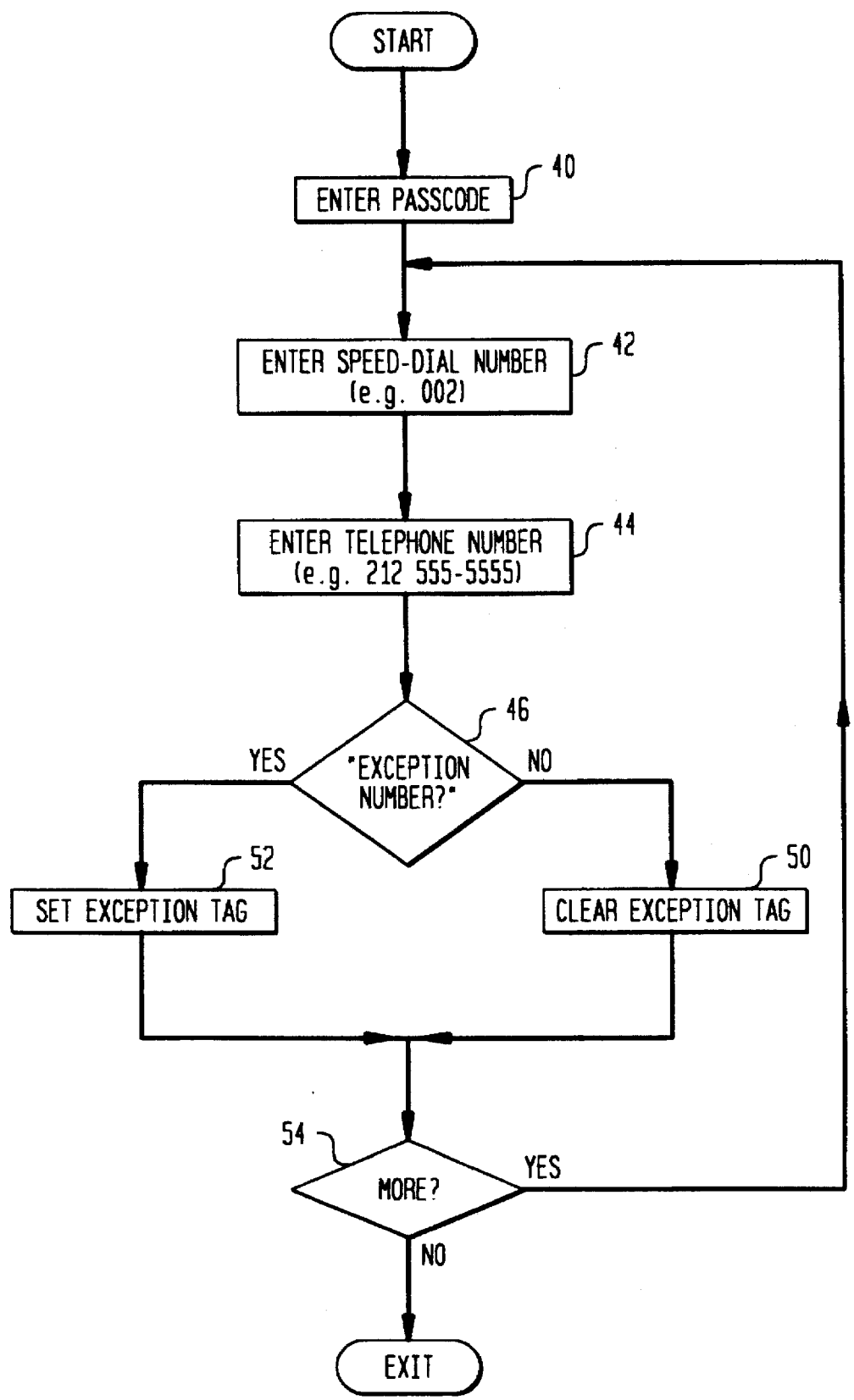

APPARATUS AND METHOD FOR SELECTIVE ARCHIVING OF FACSIMILE MESSAGES

BACKGROUND OF THE INVENTION

The subject invention relates to systems for the transmission and reception of facsimile messages. More particularly, it relates to such systems where facsimile signals which are transmitted to, or received from, other, remote facsimile stations are also retransmitted to an archive for storage.

In modern facsimile systems there is often a need to maintain an archival record of facsimile messages which are transmitted or received. For example, many stock brokers maintain a recorded log of all telephone orders as a record in case of a later dispute. Similarly, such brokers will maintain an archival record of orders which are received or transmitted by facsimile.

One problem with such archiving systems results from the fact that facsimile signals have a relatively low information density. At two hundred dots per inch a facsimile signal representative of a single 8½ by 11 sheet represents well over 3 million pixels. While various coding schemes substantially reduce the number of data bytes required to represent the values for these pixels it is clear that the amount of data which must be stored for a facsimile signal far exceeds the data required to represent the same information as alphanumeric code. Thus storing an archive of facsimile messages in digital form can easily require large amounts of digital storage, while printing of archival facsimile copies is slow and requires substantial amounts of paper file storage space.

Heretofore there has not been an easy and automatic way in which the amounts of storage required for a facsimile archive could be reduced. Accordingly, it is an object of the subject invention to provide a facsimile system which simply and conveniently provides for archival storage of facsimile signals while reducing storage requirements.

BRIEF SUMMARY OF THE INVENTION

The above object is achieved and disadvantages of the prior art are overcome in accordance with the subject invention by means of a facsimile system and method for operating such a system wherein a scanner scans documents to generate facsimile signals representative of the documents and a communications mechanism is provided to transmit such facsimile signals to remote stations, one or more of the remote stations being an archive; and for receiving facsimile signals representative of documents to be printed by the facsimile system. A printer, responsive to the communications mechanism, is provided for printing of documents representative of the received facsimile signals. The facsimile system also includes a memory, a controller, and an input for input of operator control signals. The memory includes storage for a directory of remote station identifications, buffer storage of facsimile signals to be transmitted or which have been received, and various system parameters such as the telephone number used by the facsimile system, the speed and other operating characteristics of the communications mechanism, etc. The controller controls the facsimile system to: respond to operator control signals to scan a document, establish communications with a selected remote station, and transmit facsimile signals representative of the scanned document to the selected remote station; respond to reception of a facsimile signal from a transmitting remote station to print a document representative of the received facsimile signal; compare the identity of the selected remote station or the transmitting remote station with the directory of remote station identifications and retransmit the transmitted facsimile signal or the received facsimile signal to the archive only if the remote station is not identified as an exception in the directory of remote station identifications.

In accordance with one aspect of the subject invention the directory of remote station identifications is a speed dial directory.

In accordance with another aspect of the subject invention the facsimile system prompts an operator to tag remote stations as exceptions during programming of the speed dial directory.

In accordance with another aspect of the subject invention the facsimile system tests for input of a predetermined password before prompting an operator to program the speed dial directory.

In accordance with still another aspect of the subject invention the controller is further for generating a transaction status report when a facsimile signal is received and generating a transaction status report when a facsimile signal is transmitted, and said status reports are appended to corresponding signals retransmitted to the archive.

In accordance with still yet another aspect of the subject invention the controller is further responsive to predetermined settings of certain of the system parameters to selectively apply results of the comparison of remote station identifications with the directory of remote station identifications to both transmitted and received facsimile signals, only transmitted facsimile signals, only received facsimile signals, or to identify no exceptions and archive all facsimile signals.

Thus it can readily be seen that the subject invention achieves the above object and overcomes the disadvantages of the prior art. Other objects and advantages of the subject invention will be apparent to those skilled in the art from consideration of the attached drawings and the detailed description set forth below.

BRIEF DESCRIPTION OF THE DRAWINGS

FIG. 1 is a schematic block diagram of a facsimile system in accordance with the subject invention.

FIG. 2 is a schematic representation of a remote station identification directory used in the subject invention.

FIG. 3 is a schematic flow diagram of the operation of the subject invention in programming the remote station identification directory.

DETAILED DESCRIPTION OF PREFERRED EMBODIMENTS OF THE SUBJECT INVENTION

Figure 4:
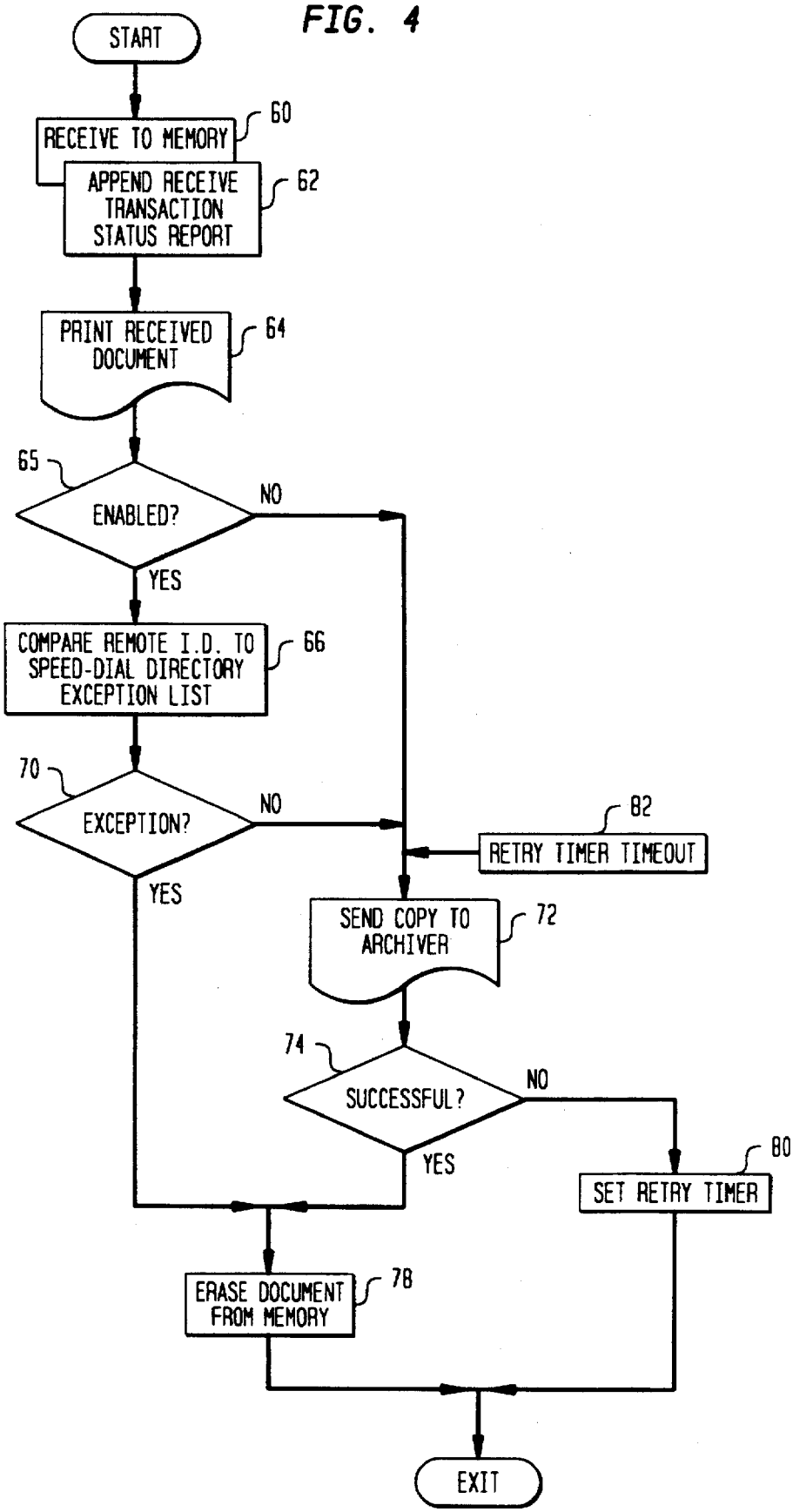
FIG. 4 is a schematic flow diagram of the operation of the subject invention in receiving and archiving a facsimile signal.

Turning to FIG. 1 facsimile system 10 includes scanner 12, for scanning documents to produce facsimile signals representative of those documents, printer 14 for printing documents representative of received facsimile signals, and modem 18 for transmitting and receiving such facsimile signals over the telephone network. While communication over the telephone network is typical other means of communications, such as radio transmission or direct wired connection, are within the contemplation of the subject invention and could be readily implemented by those skilled in the art.

Facsimile system 10 also includes operator controls 19 for input of operator control signals and display of prompts, programmable memory 20 for storing remote station identification directory 20-1, document storage 20-2, and system parameters 20-3.

Directory 20-1 stores remote station identifications which are used to control the archiving function of the subject invention, as will be described further below. Document storage 20-2 provides temporary storage for facsimile signals which are to be transmitted at a later time, retransmitted because of error, as well as temporary storage of received facsimile signals which await access to printer 14. System parameters 20-3 include parameters such as the identification of system 10 (i.e. its phone number) the speed and other operating parameters of modem 18 and other conventional parameters, as well as certain other parameters which are used to control the archiving function as will be described further below.

The operation of facsimile system 10 is controlled by controller 22 which typically comprises a conventional microprocessor operating under control of program code stored in read-only-memory.

The operation of facsimile system 10 under control of controller 22 in scanning documents, printing documents, transmitting and receiving facsimile signals, and in temporarily storing such facsimile signals is conventional and well understood by those skilled in the art and need not be described further for an understanding of the subject invention.

FIG. 2 shows a schematic representation of remote station identification directory 20-1. In accordance with a preferred embodiment of the subject invention directory 20-1 also serves as a conventional speed dial directory and will be referred to as such from time to time hereafter. The subject invention thus recognizes that those numbers which are most frequently called are also the numbers most likely to be excepted from archiving. For example, communications between a broker's representative and the broker's research department may not need to be archived, and the representative's lunch order to the local delicatessen almost certainly will not need to be archived; while both numbers will likely be in the representative's speed dial directory. Thus the subject invention can be easily and efficiently implemented by a simple change to a conventional speed dial directory as shown in FIG. 2. In FIG. 2 directory 20-1 comprises locations L-1 through L-n. Each location consist of fields P, SD, and EF (shown only for location L-1 for ease of illustration). Field P contains a conventional phone number which is associated with a speed dial number, typically two or three digits, stored in field SD for that location. As is well known when the speed dial function is selected and a speed dial number is entered the system will search the directory 20-1 to find the entered speed dial number and then automatically dial the associated phone number in field P. In accordance with the subject invention speed directory 20-1 is modified by the addition of field EF consisting of one or more bits used to tag a phone number as a remote station identification for which facsimile messages need not be archived, as will be described further below.

FIG. 3 shows a flow diagram of the operation of facsimile system 10 in programming of speed dial memory 20-1. Once the programming function is activated then at 40 the operator is prompted and enters a pass code. While pass codes are not normally required to program speed dial memories a password is preferred in the subject invention to assure that only authorized operators can except messages from the archiving function. Then at 42 and 44 the operator is prompted and enters speed dial numbers and telephone numbers in a conventional manner and these numbers are stored in the next available location in speed dial memory 20-1. Then at 46 the operator is prompted to determine if the phone number just entered is a "exception number"; a number for which communications are excepted from archiving. If the operator responds negatively then at 50 field EF is cleared. If the operator responds positively then at 52 field EF is set to tag the phone number as an exception. Then, at 54, if more speed dial numbers are to be programmed system 10 returns to 42 and otherwise exits.

In accordance with a preferred embodiment of the subject invention certain of the system parameters in storage 20-3 can be set so that both transmitted and received facsimile systems are tested against directory 20-1, only transmitted facsimile signals are tested against 20-1, only received facsimile signals are tested against 20-1, or no facsimile signals are tested against 20-1.

FIG. 4 shows a flow diagram of the operation of facsimile system 10 in receiving a facsimile signal. At 60 system 10 receives a facsimile message from a remote station, at 62 generates a receive transaction status report and appends the report to the received facsimile signal, which is stored in document storage 20-2. Then, at 64, assuming printer 14 is available, system 10 prints a document representative of the received facsimile signal. At 65 system 10 tests to determine if the archiving exceptions function is enabled for received signals. If it is not enabled system 10 goes to 72 to archive the received signal, as will be described below. Otherwise, at 66 system 10 compares the remote station identification (i.e. the remote station telephone number which is conventionally included in the transmitted facsimile signal) to the phone numbers listed in speed dial directory 20-1. At 70 system 10 determines if the remote station identification is listed in directory 20-1 and tagged as an exception. If the remote station is not listed as an exception then, at 72, system 10 transmits the received facsimile signal to a predetermined archive station, which may be another facsimile station if paper documents are to be archived or may be a data processing system if facsimile signals are to be archived in digital form.

At 74, system 10 tests to determine if the transmission to the archive station was successful. If so, or if the remote station was identified as an exception at 70, then, at 78, the facsimile signal is erased from memory 20-2 and the system exits. If the transmission to the archived station was unsuccessful, then at 80 the system sets a retry timer and exits. At a later time the retry timer will time out at 82, generating an internal interrupt and causing system 10 to reenter the program at 72 to again attempt to transmit the facsimile signal to the archive station.

Figure 5:
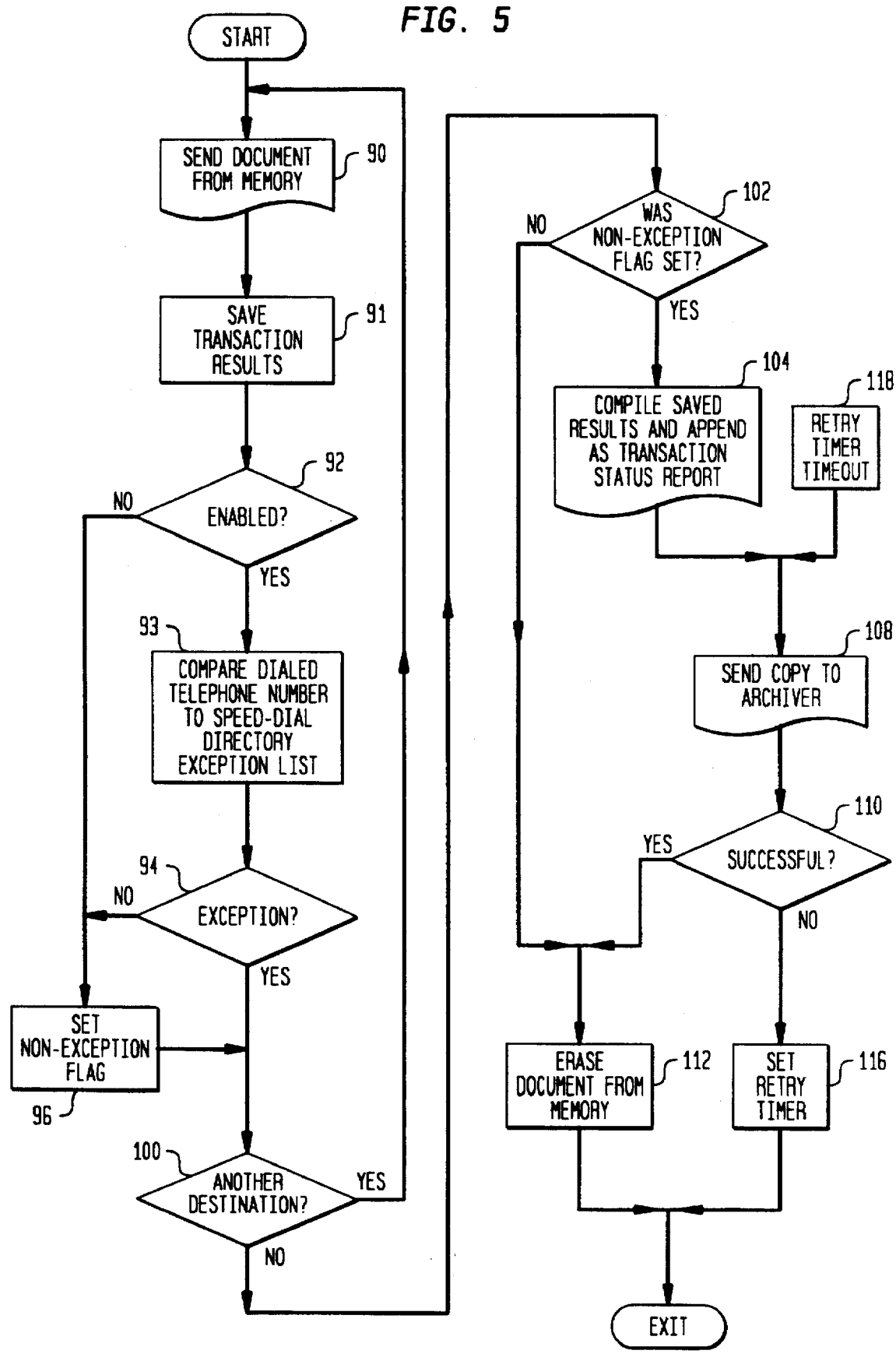
FIG. 5 is a schematic flow diagram the operation of the subject invention in transmitting and archiving a facsimile signal.

Turning to FIG. 5 a flow diagram of the operation of system 10 in transmitting a facsimile signal is shown. At 90 a facsimile signal which has been generated by scanner 12 and stored in document storage 20-2 in a conventional manner is transmitted to a remote station whose telephone number has been input by an operator, either as a complete number or as a speed dial number. At 91 the transaction results are saved for subsequent use. At 92 system 10 tests to determine if the archive exception function is enabled for transmissions. If the function is not enabled for transmissions system 10 goes to 96 to archive the transmitted signal as will be described below. Otherwise, at 93 the telephone number of this remote station is compared to speed dial directory 20-1. At 94 system 10 tests to determine if the number for the remote station is tagged as an exception. If it is not tagged then, at 96, a non-exception flag is set and system 10 goes to 100. If the phone number is not tagged then system 10 goes directly to 100 and tests to determine if the facsimile signal is to be transmitted to another remote station. If so system 10 returns to 90 to transmit the facsimile signal to the next remote station. Automatic transmission of facsimile signals to a sequence of remote stations is well known in the art and need not be discussed further here for an understanding of the subject invention.

Then, at 102 system 10 tests to determine if the non-exception flag was set. If the flag was set then, at 104, system 10 generates a transaction status report from results saved at 91 and appends the report to the facsimile signal stored in document storage 20-2. Thus the transmitted signal will be archived unless each station which received the signal was excepted. Then, at 108, system 10 sends the facsimile signal and appended transaction status report to a predetermined archive station, and at 110 tests to determine if the transmission was successful. If the transmission was successful, or if the non-exception flag was not set, then at 112 the facsimile signal is erased from documents storage 20-2 and system 10 exits. If the transmission to the archive station was not successful then at 116 system 10 sets a retry timer and exits. At a later time the retry timer times out at 118 and system 10 returns to the program at 108 to attempt again to transmit the facsimile signal to the archive station.

The above descriptions are set forth by way of illustration only and other embodiments of the subject invention will be apparent to those skilled in the art from consideration from the detailed description set forth above and the attached drawings. Accordingly, limitations on the scope of the subject invention are to be found only in the claims set forth below.

We claim:

1. A facsimile system comprising:
   a) a scanner for scanning documents, to generate facsimile signals representative of said documents;
   b) communications means for transmitting facsimile signals representative of said scanned documents to remote stations, one of said remote stations being an archive, and for receiving facsimile signals representative of documents to be printed by said facsimile system;
   c) a printer, responsive to said communications means, for printing documents representative of said received facsimile signals;
   d) a memory for storing a directory of remote station identifications, buffer storage of said facsimile signals to be transmitted and said received facsimile signals, and system parameters;
   e) operator input-output means for input of operator control signals and display of prompts, and
   f) control means for controlling said facsimile system to;
      f1) respond to certain of said operators control signals to scan a document, establish communications with a selected one of said remote stations and transmit facsimile signals representative of said scanned document to said selected remote station;
      f2) respond to reception of a facsimile signal from a transmitting remote station to print a document representative of said received facsimile signal; and
      f3) compare the identity of said selected remote station or said transmitting remote station with said directory of remote station identifications and retransmitting said transmitted facsimile signal or said received facsimile signal to said archive only if said remote station is not identified as an exception in said directory of remote station identifications; wherein
   g) said directory is a speed dial directory, and said facsimile system prompts an operator to tag remote stations as exceptions during programming of said speed dial directory.

2. A facsimile system as described in claim 1 wherein said control means tests for input of a predetermined password before permitting an operator to program said speed dial directory.

3. A facsimile system as described in claim 2 wherein said control means is further for generating a receive transaction status report when a facsimile signal is received and a transmit transaction status report when a facsimile signal is transmitted, and said confirmation signals are appended to corresponding facsimile signals retransmitted to said archive.

4. A facsimile system as described in claim 1 wherein said control means is further for generating a receive transaction status report when a facsimile signal is received and a transmit transaction status report when a facsimile signal is transmitted, and said confirmation signals are appended to corresponding facsimile signals retransmitted to said archive.

5. A facsimile system as described in claim 1 wherein said control means is further responsive to certain of said system parameters to selectively apply results of said comparison to both transmitted and received facsimile signals, only transmitted facsimile signals, only received facsimile signals or no facsimile signals in accordance with predetermined settings of said certain parameters.

6. A method of archiving facsimile signals, said method comprising the steps of:
   a) prompting an operator to tag remote stations as exceptions during programming of a speed dial directory with identities of remote stations; then
   b) transmitting or receiving a facsimile signal,
   c) determining an identity for one of said remote stations which transmitted or received said facsimile signal,
   d) comparing said identity to with said speed dial directory and retransmitting said facsimile signal to an archive station only if said one of said stations is not identified as an exception in said speed dial directory.

7. A method as described in claim 6 wherein said directory is a speed dial directory.

8. A method as described in claim 6 wherein a confirmation signal is appended to said facsimile signal prior to retransmission of said facsimile signal to said archive station.

9. A method as described in claim 6 comprising the further step of testing certain system parameters to determine if said identity for a remote station is to be compared to said directory.

* * * * *